United States Patent Office 3,590,104
Patented June 29, 1971

3,590,104
PROCESS FOR PREPARING O,O-DIALKYL-O-PHENYL PHOSPHOROTHIOATES
Delbert L. Hanna, Oak Park, Ill., assignor to Velsicol Chemical Corporation, Chicago, Ill.
No Drawing. Filed Feb. 26, 1968, Ser. No. 707,936
Int. Cl. C07f 9/12; A01n 9/36
U.S. Cl. 260—973     12 Claims

ABSTRACT OF THE DISCLOSURE

A process for preparing an O,O-dialkyl-O-phenyl-phosphorothioate which comprises reacting O,O-dialkyl-chloro-phosphorothioate with a sodium phenolate hydrate in the presence of an aromatic hydrocarbon solvent and an alkylamine catalyst while removing water azeotropically from the reaction mixture, and thereafter recovering the desired product.

---

This application relates to a process for preparing esters of phosphorothioic acids and more particularly to a process for preparing O,O-dialkyl-O-phenylphosphorothioates.

Esters of phosphorothioic acids and particularly O,O-dialkyl-O-p-nitrophenyl - phosphorothioates are valuable chemical compounds and certain of the compounds within this class are important insecticides. These compounds have been prepared by a wide variety of different processes and processing schemes. One of the more commonly used processes for preparing these valuable compounds utilizes the reaction of a corresponding O,O-dialkyl chlorophosphorothioate and anhydrous sodium phenolate such as sodium p-nitrophenolate. This reaction is difficult to carry out, however, particularly on an industrial scale and suffers from a number of serious limitations and disadvantages. Aside from the production of low yields of relatively impure product and lengthy reaction periods, the sodium phenolate reactant in the anhydrous state is extremely dangerous to handle as it tends to lump together or agglomerate and in such form readily ignites from such causes as friction with a resultant violent decomposition. Accordingly, when employing anhydrous sodium phenolate directly in the reaction very careful controls and procedures must be utilized in handling the anhydrous sodium phenolate to eliminate the danger of fire and explosion. This is a particularly serious limitation when conducting the reaction on an industrial scale where substantial quantities of the anhydrous sodium phenolate must be handled in bulk and consequently the possibilities of agglomeration and ignition of the phenolate are greatly increased.

This problem in the handling of the anhydrous sodium phenolate is often minimized or avoided by starting the reaction directly with a phenol such as p-nitrophenol and then converting the phenol to the sodium salt in situ in the presence of a solvent during the reaction while maintaining anhydrous conditions. This procedure results in the formation of the anhydrous sodium phenolate while it is dispersed within the solvent which greatly lessens the possibilities of agglomeration and ignition of the phenolate. While this procedure of starting directly with a phenol avoids the problems incident to the handling of anhydrous sodium phenolate, it is not as desirable as starting the reaction directly with the sodium phenolate because aside from the higher cost of the phenol, the procedure must involve other materials in the reaction such as a source of the sodium which increases production costs and the possibility of product contamination.

Accordingly, an object of this invention is to provide a process for preparing O,O-dialkyl - O - phenylphosphorothioates which utilizes a sodium phenolate reactant directly but which avoids the hazards usually associated with the direct use of such a reactant. A further object is to provide a process which is capable of safely producing high yields of pure product and which is particularly adaptable to large scale industrial operation. These and other objects of this invention will be apparent from the following further detailed description thereof.

These objects are achieved according to this invention by employing the sodium phenolate directly in the reaction in the form of its hydrate which does not possess the hazardous nature of the anhydrous form. The direct use of the safer and less expensive hydrate form of the sodium phenolate is permitted by effecting the reaction according to an interrelated combination of processing features or steps which basically comprise reacting the O,O-dialkyl-chloro-phosphorothioate with an excess of the sodium phenolate hydrate above the amount required for the reaction at a relatively low reaction temperature in the presence of an aromatic hydrocarbon solvent and a specific quantity of an alkylamine catalyst while continuously removing water during the reaction.

The phosphorothioates which can be prepared by the process of this invention in a safe and particularly desirable industrial manner can be represented by the following general formula:

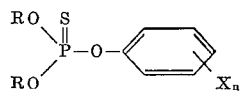

where R is an alkyl group containing from 1 to about 5 carbon atoms, X is selected from the group consisting of alkyl of from 1 to about 5 carbon atoms, a halogen such as chlorine or bromine, nitro or methylmercapto, and $n$ is an integer of from 1 to about 3. Of the various phosphorothioates represented by the above formula, the compounds which are most advantageously prepared particularly in a highly safe procedure are the compounds where R, in the above formula, is methyl or ethyl and X is nitro, especially when located in the para position on the phenyl ring. These preferred compounds, namely, O,O-dimethyl- or O,O-diethyl-O-p-nitrophenyl-phosphorothioates are the economically important insecticides known respectively as methyl parathion and parathion.

The O,O-dialkyl-chlorophosphorothioates which can be reacted with the sodium phenolate hydrate reactant to prepare the above phosphorothioates can be represented by the following formula:

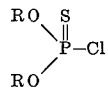

where R has the same significance as above. When preparing the preferred compounds of this invention as set forth above, the chlorophosphorothioates represented by the above formula have R methyl or ethyl and include such compounds as O,O-dimethyl-chlorophosphorothioate or O,O-diethyl-chlorophosphorothioate, respectively. The sodium phenolate hydrate reactant can be represented by the following formula:

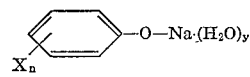

where X and $n$ have the same significance as above and where $y$ ranges from about 1 to about 4. In preparing the preferred compounds, as defined above, the phenolate hydrate reactant used in the reaction preferably comprises sodium-p-nitrophenolate hydrate.

In effecting the reaction according to the process of this invention, the advantageous results achieved, particularly in permitting the direct use of the inexpensive and safe sodium phenolate hydrate reactant, are greatly dependent upon reacting the O,O-dialkyl-chlorophosphorothioate with an excess of the sodium phenolate hydrate reactant. For example, while one mol of the phenolate reactant is stoichiometrically required per one mol of the chlorophosphorothioate to produce one mol of product, the desired results of this invention are achieved only when using a quantity of the sodium phenolate hydrate above one mol per one mol of the chlorophosphorothioate. The level of the excess employed in effecting the reaction can be varied but the excess of the phenol reactant must at least be about 3.0 mol percent above the stoichiometric molar quantity required for the reaction. The upper limit of the level of excess is not overly important and can range up to as high as about 20 percent above theory. Typically, however, particularly desirable results are achieved when utilizing an excess ranging from about 5 to about 15 percent above theory.

The catalyst utilized in effecting the reaction according to the process of this invention comprises an alkylamine and preferably a trialkylamine where the alkyl substituents contain from about 2 to about 5 carbon atoms such as triethylamine or tributylamine with triethylamine being preferred. In using the alkylamine catalyst in the process it is important that the catalyst be employed within a certain limited range if high product yields are to be obtained within short reaction periods. While this amount can vary somewhat depending upon the particular catalyst as well as the level of the excess of the sodium phenolate reactant employed, the catalysts should be present in a range of from about 0.4 to 0.9 weight percent based upon the weight of the chlorophosphorothioate reactant. Catalyst quantities above this range usually produce undesirable side products which substantially detract from the attainment of economic yields while quantities below this range generally result in a slow reaction rate which precludes efficient industrial operation. The quantity of the catalyst utilized preferably falls within a more specific range than the range set forth above especially to attain high product yields. For example, when using such catalysts as the preferred triethylamine, the quantity advantageously ranges from about 0.55 to 0.85 or about 0.7 weight percent of the chlorophosphorothioate reactant.

The reaction is effected in the presence of an aromatic hydrocarbon solvent which is capable of forming an azeotrope with water and includes such solvents as benzene, toluene, xylene or ethyl benzene. Of the various solvents which can be employed, however, toluene is particularly preferred because of its low toxicity and especially because of its desirable boiling ranges at sub-atmospheric pressures. The quantity of the solvent employed is not critical, but the solvent should at least be present in a quantity sufficient to provide a readily stirrable reaction mixture. Typically, satisfactory results are obtained when the solvent such as toluene is present in an amount ranging from about 0.5 to 4 and preferably 1 to 2 weight parts of solvent per one weight part of the phenolate reactant.

When utilizing the combination of processing features according to this invention, the temperature used to effect the reaction can be quite low, ranging down to as low as about 40° C. This permissible low operating temperature is quite advantageous because it permits the reaction to be conducted readily on a large scale with a minimum of the hazards usually encountered in conducting the reaction. Typically, the temperature can range from about 40° C. to about 100° C. Preferably the temperature employed is a refluxing temperature of the reaction mixture within this range which will be dependent upon such factors as the particular solvent employed and the pressure used for the reaction. When using the preferred solvent, toluene, the refluxing temperature preferably ranges from about 50° C. to 80° C. or about 70° C. employing subatmospheric pressures ranging from about 15 to 30 centimeters of mercury. The duration of the reaction at these temperatures will vary depending upon such factors as the particular temperature, the level of the excess of the sodium phenolate reactant as well as the particular catalyst and the amount used. Usually, however, extremely short reaction periods can be achieved, which are particularly desirable on an industrial scale, ranging as short as about 3 or 5 hours. Conveniently, the appropriate reaction period can be readily determined by continuously analyzing the reaction mixture for any unreacted O,O-dialkyl-chlorophosphorothioate and when substantially all has been reacted, the reaction can be terminated.

In effecting the reaction, it is important to remove water from the system during the reaction. This can be readily achieved by continuously removing the water from the refluxing reaction mixture as an azeotrope. In association with removal of the water during the reaction, while the reaction can be initiated by bringing the sodium phenolate hydrate and the chlorophosphorothioate into reactive contact at the desired reaction conditions, it generally is desirable to first remove the water of hydration from the sodium phenolate just prior to reacting it with the chlorothiophosphorothioate. While this dehydration of the sodium phenolate hydrate which normally contains substantial quantities of water ranging up to about 22 weight percent can be achieved by several different conventional techniques, a particular advantageous and highly preferred procedure is to dehydrate the phenolate by admixing the phenolate and solvent and then distilling the admixture at an elevated temperature and reduced pressure, such as 80 to 90° C. and 50 to 60 centimeters of mercury pressure to remove the water of hydration azeotropically. It is not necessary and, in fact, is not usually desirable to remove all of the water of hydration from the phenolate prior to the reaction. Preferably only about 60 to 70 weight percent of the water is removed by azeotropic distillation prior to the reaction with the remaining portion of the water being removed as an azeotrope during the refluxing of the reaction mixture. After the water of hydration in the phenolate reactant has been reduced to the desired level, the amine catalyst and the chlorophosphorothioate reactant can be added with suitable adjustment of the temperature and pressure to the desired ranges, and the reaction then permitted to occur.

While the process of this invention can be adapted to continuous operation, a batch type operation is preferred. Typically, a batch type operation in a preferred procedure according to this invention involves charging a sodium phenolate hydrate, such as sodium p-nitrophenolate, adjusted to the desired level of molar excess and a solvent, such as toluene, to a closed reaction vessel. Then the admixture is heated to reflux temperature at a sub-atmospheric pressure with suitable agitation for a period of time sufficient to remove the desired quantity of the water of hydration from the phenolate reactant. The admixture is then cooled to approximately the desired reaction temperature and the appropriate quantity of amine catalyst such as triethylamine, and desired O,O-dialkyl-chlorophosphorothioate are added. As an alternate procedure which permits a maximization of product yield, the catalyst is first added to the admixture, the temperature and pressure adjusted to the desired reaction ranges, and then while maintaining such reaction conditions the O,O-dialkyl chlorophosphorothioate is slowly added to the reaction mixture at an addition rate adjusted so that a substantial part of the chlorophosphorothioate is reacted as it is added. After the addition of the catalyst and chlorophosphorothioate is complete using either procedure the reaction mixture is then heated at the desired refluxing temperature at a reduced pressure for a period sufficient to complete the reaction. The terminal point of the reaction can be conveniently determined by sampling the reaction mixture and when substantially no unreacted chlorophosphorothioate remains the refluxing can be terminated and the reaction mixture cooled. The desired product can then be recovered from the reaction mixture and purified by conventional techniques including washing and distillation of solvent to recover the desired product in high yield and purity.

The following examples are offered to illustrate the process of this invention but are not intended to limit the invention to the particular reactants, reaction conditions or procedures illustrated therein.

EXAMPLE 1

O,O - dimethyl-O-p-nitrophenyl-phosphorothioate was prepared by the process of this invention according to the following procedure:

About 26.4 pounds of sodium p-nitrophenolate hydrate (0.129 mol; 5.4 percent excess) containing approximately 21.4 weight percent of water and 45 pounds of toluene were charged to a reaction vessel equipped with a distillation column, reflux condenser and water trap. With stirring, the reactor was heated to reflux (82° C.) and maintained thereat for about 3 hours during which time about 4.15 pounds of water were collected constituting about 73.5 weight percent of the original amount. The mixture was cooled to about 60° C. whereupon 63 grams of triethylamine catalyst dissolved in about 5 pounds of toluene were added in about 5 minutes. Then 20 pounds of O,O-dimethyl-chlorophosphorothioate (0.22 mol; 98 percent pure) were added over a period of about 15 minutes. With stirring, the mixture was heated to reflux (71° C.) and was maintained thereat for about 5 hours. During this time an additional 1.35 pounds of water were collected constituting 5.5 pounds total or 98 percent of the original quantity present in the phenolate. An analysis of the reaction mixture indicated that only 1 percent of the O,O-dimethyl-chlorophosphorothioate remained unreacted. The reaction mixture was cooled and then washed in succession with water, a 3 percent sodium carbonate solution, 10 percent sulfuric acid and finally with water. The remaining washed reaction mixture was then distilled to remove the toluene leaving the desired product. Analysis by infrared spectroscopy indicated that the yield was 90.4 percent of theory based upon the O,O-dimethyl-chlorophosphorothioate.

EXAMPLE 2

O,O - dimethyl-A-p-nitrophenyl-phosphorothioate was prepared by the process of this invention according to the following procedure:

About 100 grams of sodium o-nitrophenolate hydrate (0.484 mol; 14 percent excess) containing approximately 22 weight percent of water and 222 ml. of toluene were charged to a reaction flask equipped with a distillation column, reflux condenser and water trap. With stirring, the mixture was heated to reflux and maintained thereat for about 4 hours during which time approximately 15 grams of water were collected in the trap constituting 67 weight percent of the original amount. The mixture was then cooled and 0.5 gram of triethylamine catalyst, dissolved in toluene, was added followed by 69 grams of O,O-dimethyl-chlorophosphorothioate (0.415 mol; 98 percent pure). With stirring, the mixture was heated with an adjustment of pressure to reflux (70° C.) and was maintained thereat for about 3 hours. During this time about an additional 5.1 grams of water were collected in the trap constituting 91 percent of the original quantity. An analysis of the reaction mixture indicated that only about 0.5 percent of the O,O-dimethyl-chlorophosphorothioate remained unreacted. The reaction mixture was cooled and the desired product was recovered and purified according to the general procedure of Example 1. Analysis by infrared spectroscopy indicated that the yield of the desired product was 92.3 percent of theory based upon the O,O-dimethyl-chlorophosphorothioate.

EXAMPLE 3

O,O - dimethyl-O-p-nitrophenyl-phosphorothioate was prepared by the process of this invention according to the following procedure.

About 100 grams of sodium p-nitrophenolate hydrate (0.484 mol; 15 percent excess) containing about 22 weight percent of water, 69 grams of O,O-dimethyl-chlorophosphorothioate (0.421 mol; 98 percent pure), 0.5 gram of triethylamine catalyst and 225 ml. of toluene were charged to a reaction flask equipped with a distillation column, reflux condenser and water trap. With stirring, the mixture was heated to reflux (50° C.) and was maintained thereat for about 19 hours. During this time about 20 grams of water were collected in the trap constituting 100 percent of the original amount. The reaction mixture was then cooled and the desired product was recovered and purified according to the general procedure of Example 1. Analysis by infrared spectroscopy indicated that the yield was 91.1 percent of theory based upon the O,O-dimethylchlorophosphorothioate.

I claim:

1. A process for preparing an O,O-dialkyl-O-phenyl-phosphorothioate of the following formula:

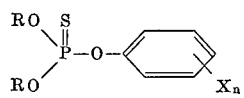

where R is an alkyl group containing from 1 to about 5 carbon atoms, X is selected from the group consisting of alkyl of from 1 to about 5 carbon atoms, chlorine, bromine and nitro and $n$ is an integer from 1 to 3 which comprises reacting O,O-dialkyl-chlorophosphorothioate of the following formula

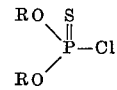

where R is as heretofore defined with a sodium phenolate hydrate of the formula:

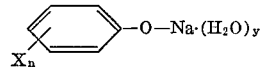

wherein X and $n$ are heretofore defined and Y is from 1 to about 4 in the presence of an aromatic hydrocarbon solvent and an alkyl amine catalyst wherein the alkyl substituents contain from 2 to about 5 carbon atoms while removing water azeotropically from the reaction mixture, and thereafter recovering the product.

2. The process of claim 1 wherein the quantity of the sodium phenolate is above the amount stoichiometrically required for the reaction.

3. The process of claim 1 wherein the alkyl amine catalyst is present in an amount of from about 0.4 to about 0.9 weight percent based upon the weight of the O,O-dialkyl-chlorophosphorothioate.

4. The process of claim 1 wherein the reaction is effected at a temperature of from about 40° to about 100° C.

5. The process of claim 1 wherein the aromatic hydrocarbon solvent is toluene.

6. The process of claim 4 wherein the catalyst is triethylamine.

7. The process of claim 1 wherein the phenolate is sodium p-nitrophenolate hydrate.

8. The process of claim 1 wherein O,O-dimethyl-O-p-nitrophenyl-phosphorothioate is prepared by reacting O,O-dimethyl-chlorophosphorothioate with sodium p-nitrophenolate hydrate.

9. The process of claim 1 wherein O,O-diethyl-O-p-nitrophenyl-phosphorothioate is prepared by reacting O,O-diethyl-chlorophosphorothioate with sodium p-nitrophenolate hydrate.

10. The process of claim 1 wherein at least 60 weight percent of the water of hydration is removed.

11. The process of claim 1 wherein O,O-dimethyl-O-p-nitrophenylphosphorothioate is prepared by the sequential steps of:

(1) heating sodium p-nitrophenolate hydrate in admixture with toluene at reflux temperature to remove water azeotropically with the quantity of the phenolate adjusted to provide at least about 3 percent above the stoichiometric quantity required for the reaction;
(2) cooling the admixture and then adding O,O-dimethyl-chlorophosphorothioate and from about 0.4 to 0.9 weight percent of triethylamine catalyst based upon the weight of the O,O-dimethyl-chlorophosphorothioate;
(3) heating the resultant reaction mixture at a reflux temperature within the range of from about 40° to 100° C. while azeotropically removing water and maintaining the reflux temperature for a period sufficient to complete the reaction; and
(4) thereafter, recovering the product.

12. The process of claim 11 wherein the sodium p-nitrophenolate hydrate is heated in the first step in the presence of toluene to remove at least 60 weight percent of the water of hydration contained in the phenolate.

References Cited

UNITED STATES PATENTS

| 2,471,464 | 5/1949 | Toy et al. | 260—973 |
| 2,784,207 | 3/1957 | Geoghegan et al. | 260—973 |
| 2,922,810 | 1/1960 | Toy et al. | 260—973X |

CHARLES B. PARKER, Primary Examiner

A. H. SUTTO, Assistant Examiner

U.S. Cl. X.R.

260—954, 964; 424—218, 225